May 22, 1973     J. J. McCOY     3,734,694
APPARATUS FOR PRODUCING $UO_2$ POWDER
Original Filed April 25, 1968     2 Sheets—Sheet 1

INVENTOR:
JOHN J. McCOY

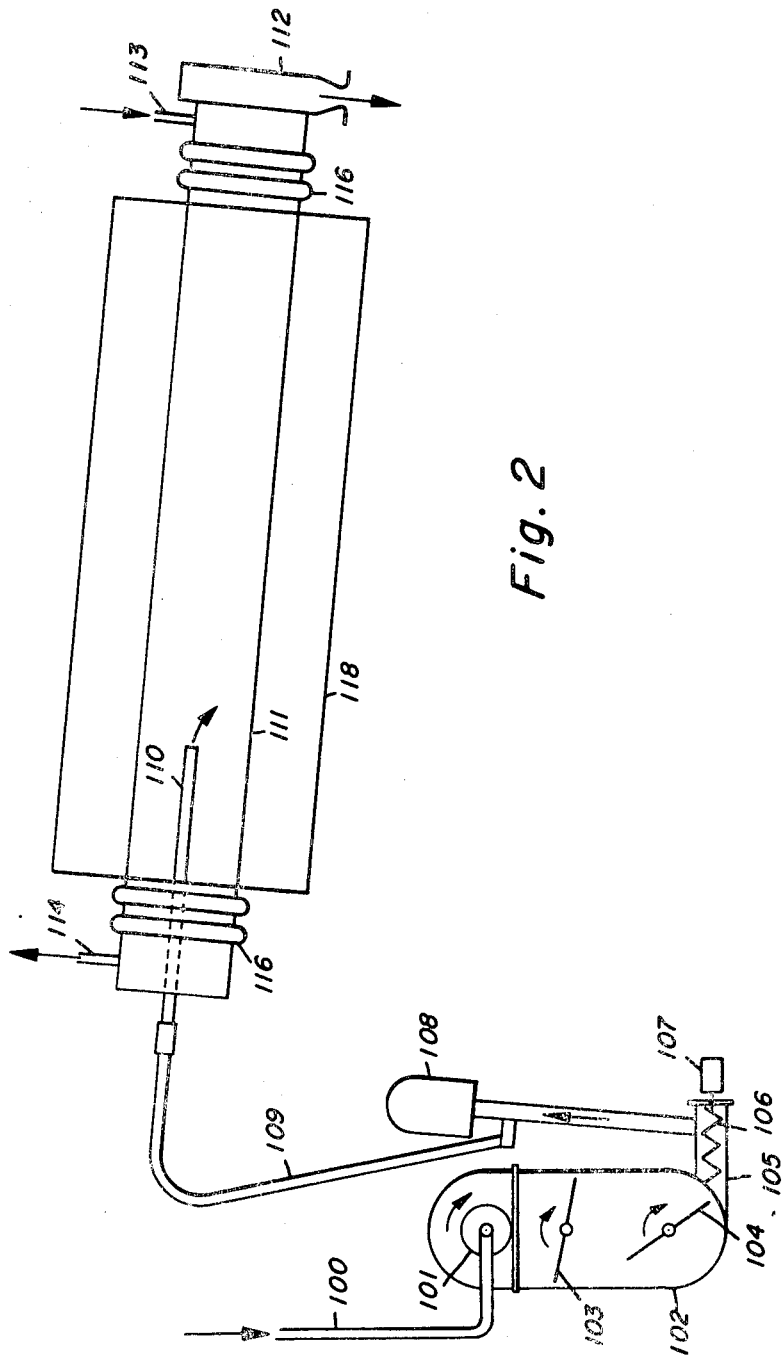

United States Patent Office 3,734,694
Patented May 22, 1973

3,734,694
APPARATUS FOR PRODUCING UO₂ POWDER
John J. McCoy, San Jose, Calif., assignor to
General Electric Company
Original application Apr. 25, 1968, Ser. No. 724,119, now Patent No. 3,579,311. Divided and this application Dec. 2, 1969, Ser. No. 881,438
Int. Cl. C01g 43/02
U.S. Cl. 23—262                    3 Claims

ABSTRACT OF THE DISCLOSURE

An improved apparatus for preparing uranium dioxide powder suitable for use in the fabrication of fuel for nuclear reactors. The apparatus has a hopper for receiving dewatered sludge, mixing means within the hopper to maintain a uniform slurry in the hopper, means for receiving the slurry from the hopper and feeding the slurry through at least one outlet, and a rotating tube calciner adapted to be maintained at a temperature in excess of 1000° F. with the outlet positioned at about the center of the calciner circumference adjacent one end thereof.

---

This application is a divisional of patent application Ser. No. 724,119, now U.S. Pat. No. 3,579,311, entitled "Process and Apparatus for Producing UO₂ Powder," filed Apr. 25, 1968 by John J. McCoy.

BACKGROUND OF THE INVENTION

Nuclear chain fission reactions and the reactors in which they take place are now well known. A typical nuclear reactor includes a chain reacting assembly or core made up of a fissile fuel material contained in fuel elements. The fuel material, in the form of pellets or granules, is generally encased in a corrosion resistant heat conductive shell or cladding. The reactor core, made up of a plurality of these elements in spaced relationship, is enclosed in a container through which the reactor coolant flows. As the coolant passes between the spaced fuel elements, it is heated by thermal energy released in the fuel material during the fission reaction. The heated coolant then leaves the reactor core, the heat energy is used to perform useful work and the now-cooled coolant is recycled back to the reactor core.

The fissile material used in the fuel of many commercial reactors is the U-235 isotope. Natural uranium, containing about 0.7% U-235 in U-238, may be used as fuel in some reactors. Large water-cooled power reactors, however, generally use uranium in which the U-235 content has been increased. This enriched uranium is most commonly available in the form of uranium hexafluoride. The $UF_6$ must undergo complex chemical processing to $UO_2$ having physical characteristics suitable for use in reactor fuel. The $UO_2$ must be very pure and have a consistent oxygen-to-uranium atomic ratio. Desirably, it should be possible to adjust the O-to-U ratio over a range of about 2 to about 2.3.

It is important that the $UO_2$ produced be sinterable or pressable to a selected density in the range of 80–97% of the theoretical maximum density of $UO_2$. While the physical and chemical characteristics necessary in a $UO_2$ powder which result in high density sintering are not fully understood, it is known that some $UO_2$ preparation processes give a product having much better sinterability than do others.

Uranium dioxide powder having excellent nuclear fuel fabrication characteristics has been prepared by the following process. Uranium hexafluoride in solid form is first vaporized. The vapor is brought into contact with water, where it is hydrolyzed forming a dilute aqueous solution of uranyl fluoride ($UO_2F_2$). This solution is then treated with ammonia to precipitate ammonium diuranate. While any desired concentration of ammonia may be used, it has recently been found that improved results are obtained where a dilute ammonia solution is added to the dilute aqueous uranyl fluoride solution. This improvement is further detailed in the copending application of W. R. De Hollander, Ser. No. 447,360, now U.S. Pat. No. 3,394,997, filed Apr. 12, 1966. The aqueous slurry is dewatered, preferably in a scroll centrifuge. The resulting paste is dried, using a belt or drum dryer. The dried ammonium diuranate is fed to a rotary calciner which removes water, ammonia, and residual fluoride and produces a free flowing $UO_2$ powder.

This powder is very pure and is easily sintered to produce high density pellets and granules. However, further improvements in the system can be achieved. In a continuous, large scale system, small simplifications in the process and equipment will result in large long-term savings in cost and materials. In particular, the step of drying the dewatered ammonium diuranate has caused problems.

Drying the slurry from the centrifuge tended to be slow and cause product non-uniformity. Large pieces of dried ammonium diuranate tend to oxidize non-uniformly in the calciner, with a burnt-appearing surface and an incompletely oxidized center. Also, significant fluoride carryover occurred in the particles. The centrifuge output tends to be irregular, since masses of dewatered ammonium diuranate intermittently break away and fall to the dryer. Thus, the size of dried pieces of ammonium diuranate leaving the dryer are irregular.

Attempts to pass the dewatered ammonium diuranate directly to the calciner have not been successful. Centrifuge output varies widely because of the irregular release of various sizes of dewatered masses of ammonium diuranate from the centrifuge which tend to oxidize non-uniformly. The rotary calciner operates most efficiently with a steady feed. Also, the large wet masses of ammonium diuranate slurry tends to stick to the calciner wall during drying. This results in removal problems, undesirably high fluoride content in the unevenly oxidized material and the production of undesired agglomerates.

Thus, there is a continuing need for improved methods and apparatus for producing high quality uranium dioxide, especially in the dewatering-drying-calcining steps.

SUMMARY OF THE INVENTION

It is, therefore, an object of this invention to provide a system for preparing $UO_2$ which overcomes the above problems.

Another object of this invention is to provide a simpler and more economical system for preparing $UO_2$ suitable for use as nuclear reactor fuel.

Another object of this invention is to provide a $UO_2$ production system which limits the carryover of residual fluorides to the product.

Still another object of this invention is to provide a $UO_2$ production system capable of a higher throughput rate than conventional systems.

Yet another object of this invention is to provide a system which produces $UO_2$ of improved uniformity and sinterability.

The above objects, and others, are accomplished in accordance with this invention by providing an improved method and apparatus for producing high quality $UO_2$ from $UF_6$ wherein thickened ammonium diuranate slurry from the dewatering means is collected in a hopper. The hopper feeds a constant displacement pump which pumps the slurry as small particles directly into the center of a rotary calciner for conversion to uranium dioxide. The pump provides a steady flow to the calciner despite irregular output from the dewatering means. Feeding the slurry as small particles into the center of the calciner tube results in paste-like pellets having a substantially dry surface when they fall to the wall of the calciner. These pellets do not stick to the calciner wall or agglomerate. As the pellets tumble in the rotary calciner, all sides are evenly contacted by the hot gases, resulting in excellent oxidation of the uranium to $UO_2$ and efficient removal of water, ammonia and residual fluorides. It appears that the surfaces of the pellets flash dry as they fall from the pump feed outlet to the lower wall of the rotating calciner tube. It has been found that this steady feed of small, uniform quantities into the calciner permits much higher throughput rates and much more uniform product characteristics than did the prior irregular feed processes.

BRIEF DESCRIPTION OF THE DRAWING

Details of the invention will be further understood upon reference to the drawing, wherein:

FIG. 2 shows a schematic representation of the improved system for preparing uranium dioxide from an ammonium diuranate slurry according to this invention.

DETAILED DESCRIPTION OF THE INVENTION

Figure 1:
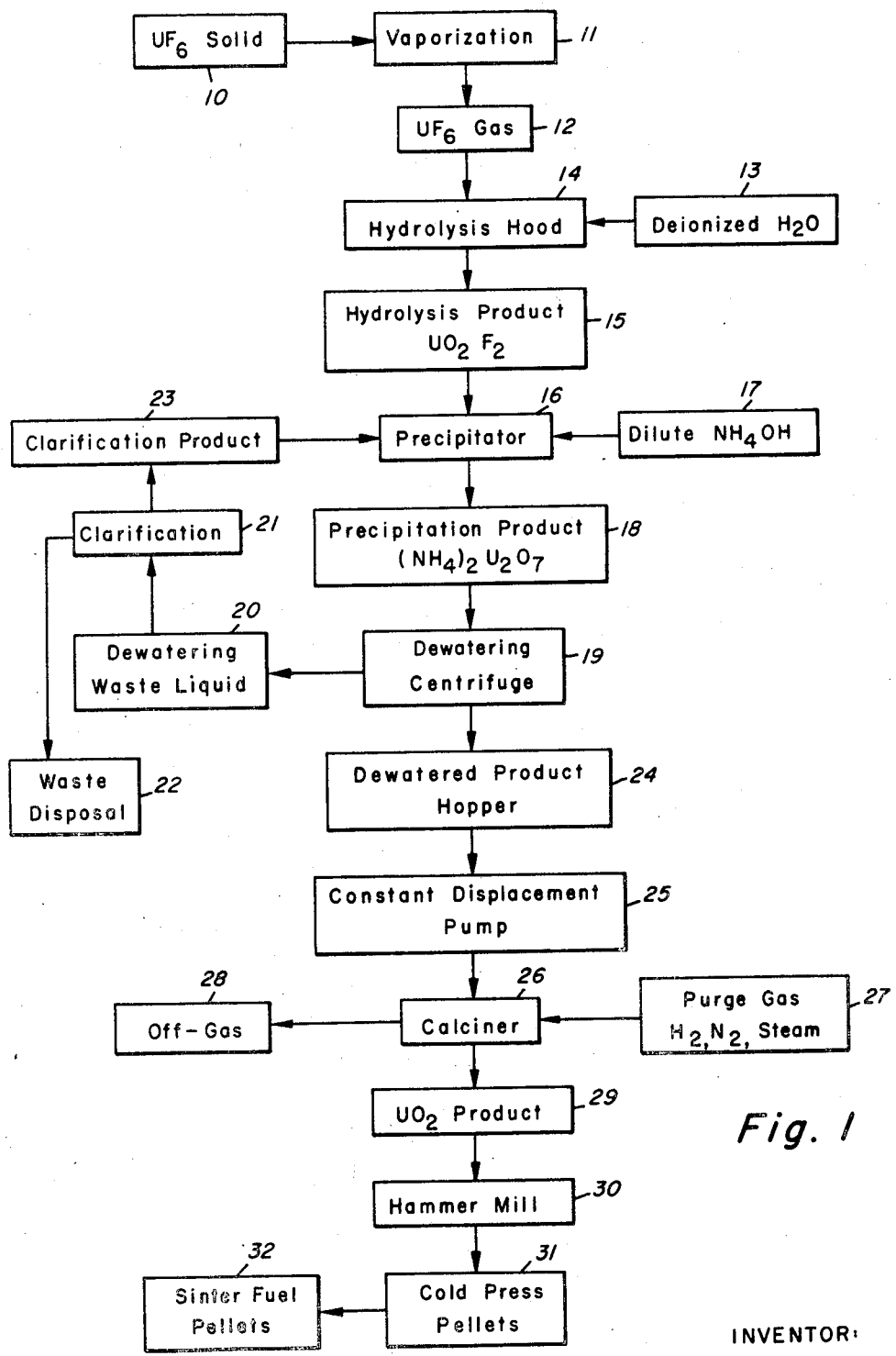
FIG. 1 shows a flow sheet for the improved $UO_2$ nuclear fuel process using the apparatus disclosed in the following description.

Referring now to FIG. 1, there is seen a block-diagram flow sheet for a process for manufacturing $UO_2$ fuel pellets, starting with $UF_6$ gas.

A cylinder 10 of solid $UF_6$, having the desired U-235 enrichment, is heated to vaporize the $UF_6$ as indicated in block 11, forming $UF_6$ gas 12. The $UF_6$ gas is bubbled through deionized water 13 in a hydrolysis hood 14, forming an aqueous solution of uranyl fluoride ($UO_2F_2$) and hydrofluoric acid (HF). This hydrolysis product 15 is pumped to a precipitation chamber 16. Dilute aqueous ammonia 17 is added to the precipitator, resulting in precipitation of ammonium diuranate [$(NH_4)_2U_2O_7$]. This precipitation product 18, in the form of a thin slurry consisting of about 2% finely divided solid ammonium diuranate and about 98% liquid (by weight) is dewatered in a conventional scroll-type centrifuge 19. The thickened output consists of about 50% solids and about 50% liquid. The dewatering waste liquid 20 removed in dewatering centrifuge 19 is sent to a clarification station 21 where waste, primarily water, is sent to a waste disposal system 22 and the clarification product 23, primarily dilute aqueous ammonia, is recycled to precipitator 16.

Meanwhile, the thickened slurry drops from the centrifuge in irregularly-sized masses into a hopper 24. The slurry is continuously agitated in hopper 24 to prevent settling of the particulate ammonium diuranate, which would form a hard sedimentary layer, plugging hopper 24 and the slurry output line from the hopper.

The thickened slurry is pumped by means of a conventional positive-displacement pump 25 of the type used to pump highly viscous materials, such as thick grease and peanut butter. Pump 25 feeds the slurry to a small outlet or group of outlets, each having a diameter of less than about 1 inch, located at about the center of a conventional tube-type rotary calciner 26.

As the slurry leaves the outlet, small pellet-shaped pieces break off and fall to the calciner wall. Apparently, as the pellets fall, their surfaces are flash dried so that they do not stick to the wall of the calciner nor do they agglomerate. As the pellets tumble in the rotating calciner, all surfaces are uniformly contacted by the hot gas stream, resulting in uniform oxidation and removal of residual ammonia and fluorides. In order to obtain a uniform product, the pellet diameter should be less than about 1 inch. Best results have been obtained with pellets having a diameter of less than about ½ inch. The slurry may either be extruded from one or more nozzles into the calciner or may, if desired, be sprayed as very small particles into the calciner.

The calciner is a conventional rotating tube calciner, having a diameter of up to about 10 inches. The calciner is maintained at a temperature above about 1000° F.; typically by means of external gas burners. Heated purge gas 27, typically a mixture of hydrogen, nitrogen and steam, is flowed counter1currently through the calciner and out to an off-gas disposal means 28. The $UO_2$ product 29 exiting the calciner is in the form of highly uniform pellets. The O-to-U atom ratio can be adjusted as desired by varying calciner conditions.

The $UO_2$ product 29 is directed to a hammer mill 30, where particle size is reduced to a diameter of about 1 to 10 microns. The resulting powder is cold pressed into preform pellets 31, then sintered at a temperature of about 3000° F. to form nuclear fuel pellets. The fuel pellets thus produced sinter to a uniform high density.

FIG. 2 shows a schematic illustration of the means for dewatering the ammonium diuranate slurry, maintaining the slurry in suspension in a hopper, and feeding the slurry to a rotary calciner.

As seen in FIG. 2, the thin slurry from the precipitator is fed through pipe 100 to a conventional scroll-type centrifuge 101. As the centrifuge rotates, a thickened paste-like slurry forms on the outside of the centrifuge and drops in masses of various sizes into hopper 102. Liquid removed in centrifuge 101 is directed to a clarification system, as described above, through a pipe (not shown). Two rotating paddles 103 and 104 continuously agitate the slurry in hopper 102 to prevent settling of the ammonium diuranate in the slurry, which would fill the bottom of the hopper with a hard sedimentary layer which would plug outlet line 105. The slurry leaves hopper 102 through outlet line 105, which contains a rotating helical wire agitator 106 driven by drive means 107. A positive displaceent pump 108 pumps the slurry through line 109 to outlet pipe 110 within rotary calciner 111. Pellet-like masses fall from outlet pipe 110 to the lower wall. As calciner 111 rotates between stationary seals 116, the pellets tumble and gradually move toward discharge opening 112. The calciner is maintained at a high temperature by conventional heating means (not shown), within outer housing 118. Purge gases enter calciner 111 through line 113 and leave through line 114 to an off-gas system. Thus, slurry which leaves centrifuge 101 in intermittent, irregularly sized masses is fed into calciner 111 as uniform pieces which dry sufficiently before they fall to the wall of calciner 111 to prevent sticking and agglomeration. The product discharged is highly uniform in chemical and physical characteristics.

Other modifications and ramifications of the present invention will occur to those skilled in the art upon reading this disclosure. These are intended to be included within the scope of this invention.

I claim:

1. An apparatus for producing uranium dioxide from a thin slurry containing ammonium diuranate and water which comprises:
   (a) centrifuge means for receiving the thin slurry of ammonium diuranate and water for dewatering to form a thickened sludge comprising ammonium diuranate and water, the product outlet of the centrifuge means being connected to
   (b) a hopper which receives said sludge comprising ammonium diuranate and water;
   (c) mixing means comprising a pair of rotatable paddles within said hopper to maintain said sludge substantially in a homogeneouse condition;
   (d) a first pipe connected to said hopper for receiving said sludge from said hopper;
   (e) drive means actuating
   (f) agitator means comprising a rotatable helical wire operative in said first pipe and serving to move the sludge through the first pipe to (g) a positive displacement pump means which feeds said sludge through a second pipe having at least one outlet and an outlet diameter of less than about 1 inch;

(h) a rotating tube calciner adapted to be maintained at a temperature in excess of about 1000° F.; and (i) said outlet positioned at about the center of the calciner circumference adjacent one end thereof.

2. The apparatus of claim 1 wherein said outlet has a diameter of less than about ½ inch.

3. The apparatus of claim 1 further including means for passing a purge gas mixture through said calciner counter-current to said slurry.

References Cited

UNITED STATES PATENTS

| 3,561,930 | 2/1971 | Brown et al. | 23—293 R |
| 1,801,000 | 4/1931 | Heath | 23—293 |
| 3,111,394 | 11/1963 | Weber et al. | 23—279 |
| 2,705,188 | 3/1955 | Swaney | 23—262 X |
| 3,450,505 | 6/1969 | Tanaka et al. | 23—285 |

JAMES H. TAYMAN, Jr., Primary Examiner

U.S. Cl. X.R.

23—279, 293 R, 355